United States Patent Office 3,738,951
Patented June 12, 1973

3,738,951
NONSMEARING ERASER ELASTOMER COMPOSITIONS
Terence C. Middlebrook, Bartlesville, Okla., assignor to Phillips Petroleum Company, Bartlesville, Okla.
No Drawing. Filed July 24, 1970, Ser. No. 58,157
Int. Cl. C08d 9/14
U.S. Cl. 260—23.7 M     6 Claims

ABSTRACT OF THE DISCLOSURE

Eraser formulations which are nonsmearing and do not require cure are disclosed, these comprising a block polymer, a vulcanized vegetable oil, a naphthenic oil and, optionally, conventional fillers, dyes, abrasives and the like.

This invention pertains to elastomer compositions.

In one of its more specific aspects, this invention pertains to rubbery materials containing oils as a plasticizer or extender.

Rubbery materials containing mineral oils as plasticizers or extenders are well known. However, in those instances where such rubbery materials are desired to be nonstaining, extended periods of cure or vulcanization are necessary.

There has now been discovered an elastomer composition which includes a naphthenic oil, which elastomer composition is nonstaining in the absence of curing and vulcanization.

According to this invention there is provided an elastomer composition comprising a block polymer, a vulcanized vegetable oil and a naphthenic oil.

Accordingly, it is an object of this invention to provide an elastomer composition in which the naphthenic oil extender comprises a considerable portion.

It is also an object of this invention to provide a rubber-based composition particularly adapted to nonsmearing usage.

The composition of this invention will comprise a block polymer, preferably a butadiene-styrene block polymer having a butadiene to styrene weight ratio of from about 4:1 to about 1:1. Such polymers are commercially available, one such material being Solprene 406 (Solprene is a trademark), an elastomer available from Phillips Petroleum Company, Bartlesville, Oklahoma, this elastomer being a 60/40 butadiene-styrene block copolymer and having 38 percent cis and 9 percent vinyl content.

The composition will include a vulcanized vegetable oil, that is, one produced from various vegetable oils by vulcanizing with sulfur at elevated temperatures. Such materials, one of which is known commercially as Factice (a trademark), are available from The Stamford Rubber Supply Company, Stamford, Conn. These materials will be present in amounts from about 1 to about 5 times the weight of the polymer employed.

The composition will include a naphthenic oil of any type conventionally used in rubber formulations. Preferably, it will have a viscosity in the range of about 100 to about 5000 SUS at 100° F. One such material is available commercially, as Sunthene 380 (a trademark), from Sun Oil Company. The naphthenic oil will be included in an amount of from about ½ to about 4 times the weight of the polymer employed.

The composition will optionally contain a particulate filler in an amount up to about 10 times the weight of the polymer employed. Fillers such as whiting, talc, clay, mica and silica, as conventionally employed in elastomer compositions, are suitable.

Optionally includable in the formulation are such other materials as may be normally included in elastomer formulations, particularly when that formulation is employed as an eraser compound. Such include powdered pumice, carbides, colorants, odorants or antioxidants, and similar materials.

Generally the compositions of this invention are particularly suitable because they are nonsmearing. For this purpose they should have a Shore A hardness of from about 18 to about 100. Their preparation is easily and conventionally carried out by blending the components in a mixer at temperatures of 50–150° C. There is no preferred order of introduction into the mixer.

A number of elastomer compositions, formulated in accordance with the above, were prepared. Compositions and properties of these blends were as follows. All blends were prepared in a mixer employing 5 to 7 minutes mixing time at 100° C.

|  | Blend number | | | | | |
|---|---|---|---|---|---|---|
|  | 1 | 2 | 3 | 4 | 5 | 6 |
| Composition, parts by weight: | | | | | | |
| Solprene 406 | 100 | 100 | 100 | 100 | 100 | 100 |
| Whiting | 0 | 250 | 250 | 450 | 150 | 600 |
| AA White Factice | 250 | 250 | 250 | 250 | 150 | 100 |
| Sunthene 380 | 150 | 200 | 400 | 300 | 200 | 200 |
| Red Dye [1] | 0 | 0.1 | 0.3 | 0.4 | 0.1 | 0.4 |
| Antiodorant [2] | 1 | 1.0 | 1.0 | 1.0 | 1.0 | 1.0 |
| Shore A Hardness | 47 | 47 | 18 | 38 | 39 | 51 |

[1] Stantone Red from Harwich Standard Chemical Company, Akron, Ohio.
[2] Rodo #0 from Vanderbilt Company, New York, N.Y.

All blends were extruded. No cure was required. All formulations were nonsmearing when employed as eraser compounds.

It will be evident from the foregoing that various modifications can be made to the scope of this invention. Such, however, are considered as being within the scope of the invention.

What is claimed is:
1. A composition of matter consisting essentially of:
   (a) a butadiene-styrene block polymer having a butadiene to styrene weight ratio within the range of from about 4 to 1 to about 1 to 1;
   (b) a vulcanized vegetable oil produced by vulcanizing a vegetable oil with sulfur, said oil being present in an amount within the range of from about 1 to about 5 times the weight of said polymer; and,
   (c) a naphthenic oil, said oil being present in an amount within the range of from about ½ to about 4 times the weight of said polymer; said composition having a Shore hardness within the range of from about 18 to about 100.
2. The composition of claim 1 in which said block polymer is a 60/40 butadiene-styrene block copolymer having a 38 percent cis and a 9 percent vinyl content.
3. The composition of claim 1 in which said naphthenic oil has a viscosity in the range of from about 100 to about 5000 SUS at 100° F.

4. The composition of claim 1 in which there is included a particulate filler in an amount up to about 10 times the weight of the polymer employed.

5. The composition of claim 4 in which said filler is selected from the group consisting of whiting, talc, clay, mica and silica.

6. The composition of claim 4 in which said naphthenic oil is present in an amount within the range of from about 150 to about 400 parts by weight per 100 parts by weight of said block polymer, said vegetable oil is present in an amount within the range of from about 100 to about 250 parts by weight per 100 parts by weight of said block polymer and a particulate filler comprising whiting is present in an amount up to about 600 parts by weight per 100 parts by weight of said block polymer.

References Cited

UNITED STATES PATENTS 3,560,593 2/1971 Hsieh _____ 260—879
2,436,457 2/1948 Soday _____ 260—23.7 X

FOREIGN PATENTS 673,229 12/1965 Belgium.

OTHER REFERENCES

"Encyclopedia of Polymer Science and Technology," pp. 493–495 (1967).

DONALD E. CZAJA, Primary Examiner

E. C. RZUCIDLO, Assistant Examiner

U.S. Cl. X.R.

260—23.7 R, 880 B